US012613107B2

(12) United States Patent
Kaku et al.

(10) Patent No.: US 12,613,107 B2
(45) Date of Patent: Apr. 28, 2026

(54) SYSTEMS AND METHODS FOR ESTIMATING LANE BOUNDARIES USING A SLICING MODEL

(71) Applicant: Woven by Toyota, Inc., Tokyo (JP)

(72) Inventors: Shunsho Kaku, Mountain View, CA (US); Jeffrey M. Walls, Mountain View, CA (US); Ryan M. Wiesenberg, South Lyon, MI (US)

(73) Assignee: Woven by Toyota, Inc., Tokyo (JP)

( * ) Notice: Subject to any disclaimer, the term of this patent is extended or adjusted under 35 U.S.C. 154(b) by 286 days.

(21) Appl. No.: 18/504,693

(22) Filed: Nov. 8, 2023

(65) Prior Publication Data

US 2025/0146835 A1     May 8, 2025

(51) Int. Cl.
*G01C 21/00*          (2006.01)
*G06V 20/56*          (2022.01)

(52) U.S. Cl.
CPC ..... *G01C 21/3819* (2020.08); *G01C 21/3833* (2020.08); *G06V 20/588* (2022.01)

(58) Field of Classification Search
CPC ............ G01C 21/3819; G01C 21/3833; G06V 20/588; G06V 10/82
See application file for complete search history.

(56) References Cited

U.S. PATENT DOCUMENTS

| | | | |
|---|---|---|---|
| 10,262,214 B1 | 4/2019 | Kim et al. | |
| 10,373,019 B2 | 8/2019 | Nariyambut Murali et al. | |
| 10,867,190 B1 | 12/2020 | Vajna et al. | |
| 2011/0019000 A1* | 1/2011 | Sakamoto | ................. G06T 5/70 348/148 |
| 2011/0081049 A1 | 4/2011 | Walter et al. | |
| 2018/0189581 A1 | 7/2018 | Turcot et al. | |
| 2021/0156963 A1 | 5/2021 | Popov et al. | |
| 2021/0209941 A1* | 7/2021 | Maheshwari | ........ G06V 20/588 |
| 2021/0304358 A1 | 9/2021 | Song et al. | |
| 2023/0112878 A1* | 4/2023 | Hiramatsu | ............. G06V 20/58 382/104 |

(Continued)

OTHER PUBLICATIONS

Liang et al., "End-to-End Deep Structured Models for Drawing Crosswalks," Proceedings of the European Conference on Computer Vision (ECCV), 2018, pp. 396-412.

(Continued)

*Primary Examiner* — Anne Marie Antonucci
*Assistant Examiner* — Patrick Daniel Mohl
(74) *Attorney, Agent, or Firm* — Christopher G. Darrow; Darrow Mustafa, PC

(57)          ABSTRACT

Systems, methods, and other embodiments described herein relate to estimating lane boundaries using a slicing model with road data for generating maps. In one embodiment, a method includes computing three-dimensional (3D) representations that are discretized from acquired data about road edges associated with driving lanes. The method also includes deriving discrete and lateral slices of the road edges using a slicing model, the road edges are connected in a road graph that describes a mapped area. The method also includes extracting features from the lateral slices individually using a neural model for forming a histogram to estimate lane boundaries about the driving lanes. The method also includes generating a map by linking the lane boundaries individually along the road edges.

20 Claims, 5 Drawing Sheets

(56) References Cited

U.S. PATENT DOCUMENTS

2023/0322216 A1* 10/2023 Lee .................. B60W 30/0956
2024/0242377 A1* 7/2024 Yi ..................... G06V 10/7715

OTHER PUBLICATIONS

Zheng et al., "RESA: Recurrent Feature-Shift Aggregator for Lane Detection," AAAI Technical Track on Computer Vision III, vol. 35 No. 4, pp. 3547-3554.
Pan et al., "Spatial As Deep: Spatial CNN for Traffic Scene Understanding," AAAI Technical Track: Vision, vol. 32, No. 1, 2018, pp. 7276-7283.
Cheng et al., "Structure-Aware Network for Lane Marker Extraction with Dynamic Vision Sensor," arXiv:2008.06204v1, Aug. 14, 2020, pp. 1-11.

* cited by examiner

SYSTEMS AND METHODS FOR ESTIMATING LANE BOUNDARIES USING A SLICING MODEL

TECHNICAL FIELD

The subject matter described herein relates, in general, to updating lane boundaries for a road and, more particularly, to estimating lane boundaries using a slicing model with road data for generating maps.

BACKGROUND

Vehicles acquire data about roads from sensors for executing driving tasks. For example, a vehicle uses sensor data to facilitate perceiving other vehicles, obstacles, pedestrians, and additional aspects of a surrounding environment. In various implementations, a vehicle uses a light detection and ranging (LIDAR) sensor that emits light to scan the surrounding environment, while logic associated with the LIDAR analyzes acquired data to detect the presence of objects and other features of the surrounding environment. In further examples, additional/alternative sensors such as cameras acquire information about the surrounding environment from which a system derives awareness about aspects of the surrounding environment. This sensor data can be useful in various circumstances for improving perceptions of the surrounding environment so that systems such as automated driving systems (ADS) can perceive the noted aspects and accurately plan and navigate accordingly.

Regarding navigation, a vehicle processes sensor data to update maps that go stale. For example, the vehicle infers a construction site by detecting a sign indicating a decreased speed and using global position system (GPS) data to identify that the map data is outdated. However, ADSs execute complex tasks that rely on high-definition (HD) maps for accuracy. A vehicle using sensor data (e.g., images, GPS, etc.) for updating maps may have insufficient accuracy for the complex tasks. As such, in one approach, systems deploy specialized vehicles that acquire advanced data about roads for updating maps through manual annotation of features (e.g., lane boundaries). The specialized vehicles and manual assistance are costly and ineffective at maintaining HD maps, thereby decreasing reliability for ADS operation and other driving tasks.

SUMMARY

In one embodiment, example systems and methods relate to estimating lane boundaries using a slicing model with road data for generating maps. In various implementations, systems updating maps encounter increased costs and complexity, particularly involving high-definition (HD) maps. For example, a system updating lane boundaries and lines that changed due to new construction and repairs manually annotates image data acquired from vehicles (e.g., fleet data). However, manually annotating data is costly, inefficient, and creates lags for real-time updates. Alternatively, a system processing sensor data within an automated mapping platform (AMP) can update an HD map but lacks accuracy for driving tasks that are complex (e.g., lane tracking), thereby reducing safety. Therefore, in one embodiment, an estimation system slices acquired data along road edges for a neural model to estimate lane boundaries through extracting features. Here, a road map defines a topology of an area having the road edges representing segments that join at a node (e.g., intersection). The estimation system may derive lateral slices using a slicing model that increases efficiency and scalability by discretizing data about the road edges. In one approach, the estimation system extracts features from lateral slices individually, thereby increasing the accuracy and definition of updating the lane boundaries.

In various implementations, the neural model includes a decoder that computes confidence values and boundary placements for the lane boundaries using a histogram of the aggregated features. Furthermore, the estimation system automatically generates a map by linking and recombining the lane boundaries along the road edges using confidence values and boundary placements. Accordingly, the estimation system generates a map with updated and fuller lane boundaries by processing sliced data individually and linking slices, thereby improving the accuracy and efficiency of generating maps (e.g., HD maps).

In one embodiment, an estimation system for estimating lane boundaries using a slicing model with road data for generating maps is disclosed. The estimation system includes a memory storing instructions, that when executed by a processor, cause the processor to compute 3D representations that are discretized from acquired data about road edges associated with driving lanes. The instructions also include instructions to derive discrete and lateral slices of the road edges using a slicing model, the road edges are connected in a road graph that describes a mapped area. The instructions also include instructions to extract features from the lateral slices individually using a neural model for forming a histogram to estimate lane boundaries about the driving lanes. The instructions also include instructions to generate a map by linking the lane boundaries individually along the road edges.

In one embodiment, a non-transitory computer-readable medium for estimating lane boundaries using a slicing model with road data for generating maps and including instructions that when executed by a processor cause the processor to perform one or more functions is disclosed. The instructions include instructions to compute 3D representations that are discretized from acquired data about road edges associated with driving lanes. The instructions also include instructions to derive discrete and lateral slices of the road edges using a slicing model, the road edges are connected in a road graph that describes a mapped area. The instructions also include instructions to extract features from the lateral slices individually using a neural model for forming a histogram to estimate lane boundaries about the driving lanes. The instructions also include instructions to generate a map by linking the lane boundaries individually along the road edges.

In one embodiment, a method for estimating lane boundaries using a slicing model with road data for generating maps is disclosed. In one embodiment, the method includes computing 3D representations that are discretized from acquired data about road edges associated with driving lanes. The method also includes deriving discrete and lateral slices of the road edges using a slicing model, the road edges are connected in a road graph that describes a mapped area. The method also includes extracting features from the lateral slices individually using a neural model for forming a histogram to estimate lane boundaries about the driving lanes. The method also includes generating a map by linking the lane boundaries individually along the road edges.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
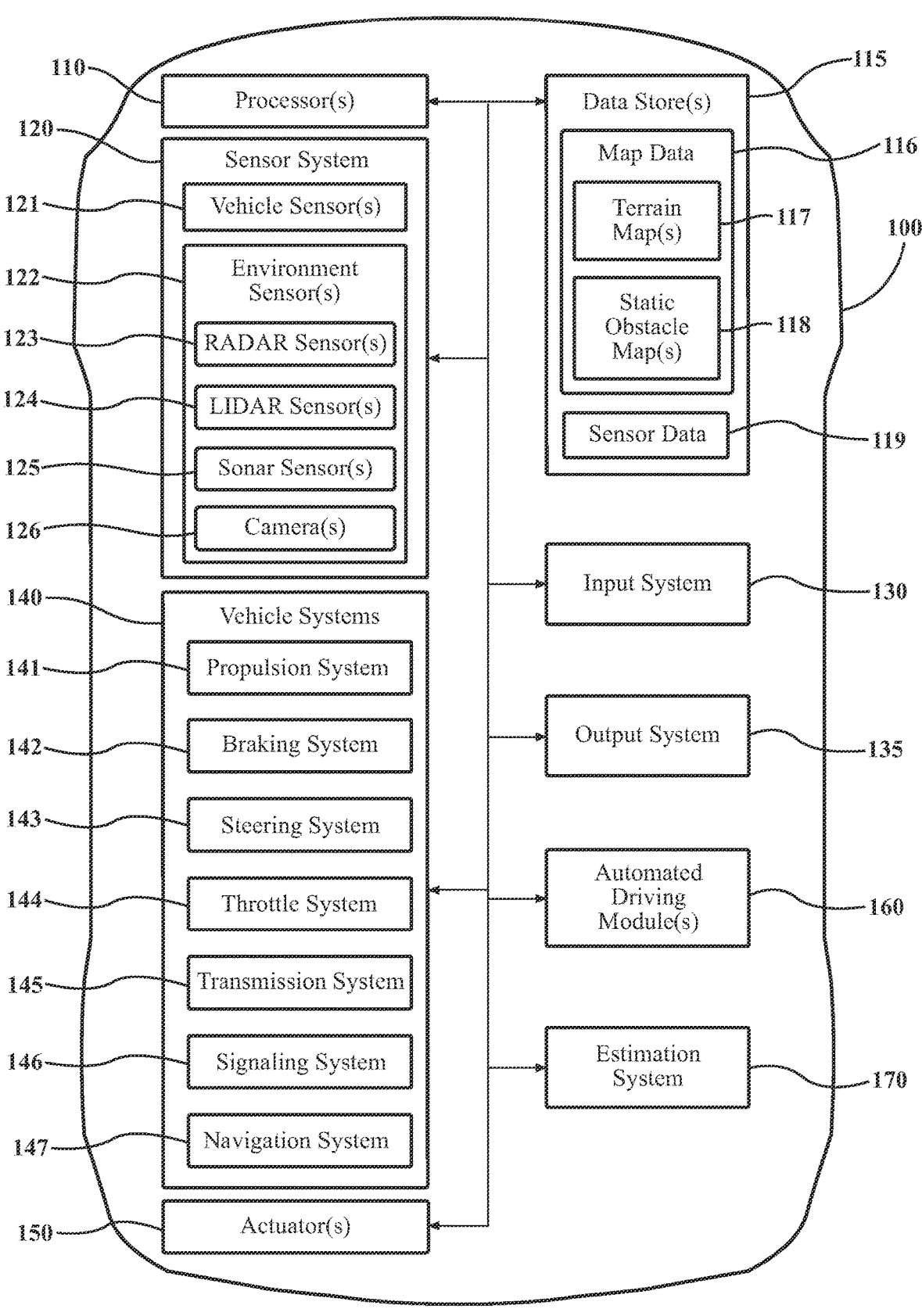
FIG. 1 illustrates one embodiment of a vehicle within which systems and methods disclosed herein may be implemented.

Systems, methods, and other embodiments associated with estimating lane boundaries using a slicing model with road data for generating maps are disclosed herein. In various implementations, systems generating detailed maps encounter difficulties from insufficient sensor information. For example, automated driving systems (ADS) rely on detailed and accurate high-definition (HD) maps for executing complex tasks (e.g., lane tracking). Unclear lane boundaries and lane lines automatically updated by a mapping platform decrease safety for ADS operation. As previously explained, manual annotation of road data acquired from specialized mapping vehicles is economically costly and inefficient. Furthermore, maps updated in this way can go stale from construction, road wear changing lane lines, etc. As such, generating HD maps having sufficient accuracy for ADS operation involving complex maneuvers (e.g., lane tracking) encounters costs and delays, thereby reducing system reliability. Therefore, in one embodiment, an estimation system generates a map by extracting features from the lateral slices individually and forming a histogram for predicting lane boundaries about the driving lanes using a neural model. Prior to extracting, the estimation system uses a slicing model to derive lateral slices about road edges that are discrete for efficiency and scalability. In one approach, a lateral slice may be a subsection of a road edge having fixed dimensions for efficient computations. Road edges represent segments from a road map that defines a topology of an area. For example, the discretization simplifies simultaneous localization and mapping (SLAM) computations longitudinally for the road by the estimation system, thereby reducing system complexity.

Moreover, the histogram can aggregate and compress features with reduced dimensions through bins that are each associated with a lateral slice, thereby improving efficiency. Regarding automatic annotation, the estimation system decodes the features and outputs confidence values and boundary placements for the lane boundaries. This can involve counting compressed data within the bins for relevancy and correlation of features. In one approach, the estimation system automatically recombines the lane boundaries individually along the road edges for generating a map, such as by merging lateral slices being adjacent that have defined features. Accordingly, the estimation system efficiently and accurately updates lane boundaries automatically through discretization and aggregation of road data, thereby avoiding manual annotations for generating maps.

In various implementations, the estimation system generates a map by labeling features using an inverse distance relationship between the lane boundaries, the confidence values, and the boundary placements. Here, the estimation system may rely on the inverse distances for simpler loss computations during training (e.g., a means square error loss), thereby reducing computation and system costs. As a further enhancement, the estimation system selects the features using the neural model by factoring a distance between compressed data in the bins and the relationship with the lane boundary. Thus, the estimation system improves the definition of lane boundaries and reduces computation costs by slicing road data that allows simpler geometric modeling and map generation.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an estimation system 170 uses road-side units (RSU), consumer electronics (CE), mobile devices, robots, drones, and so on that benefit from the functionality discussed herein associated with estimating lane boundaries using a slicing model with road data for generating maps.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an estimation system 170 that is implemented to perform methods and other functions as disclosed herein relating to estimating lane boundaries using a slicing model with road data for generating maps.

Figure 2:
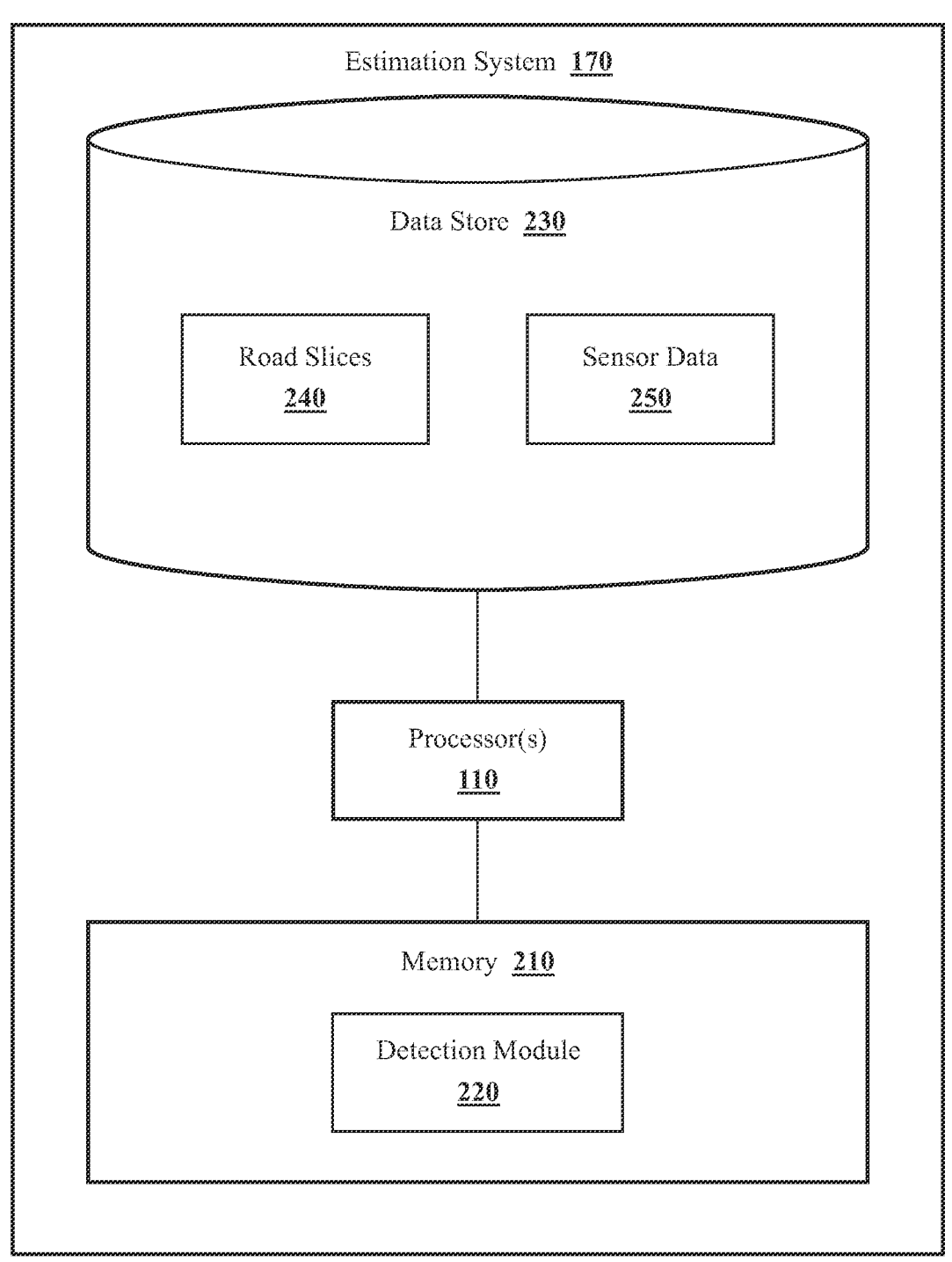
FIG. 2 illustrates one embodiment of an estimation system that is associated with estimating lane boundaries using a slicing model with road data for generating maps.

With reference to FIG. 2, one embodiment of the estimation system 170 of FIG. 1 is further illustrated. Although the embodiment implements the estimation system 170 in vehicle 100 for online computations, the estimation system 170 can also be executed offline on a server that generates maps. Online estimations benefit the vehicle 100 operating in an automated mode and other applications demanding high-resolution and accurate map data. Offline estimations benefit from increased computing power than the vehicle 100, thereby improving accuracy and computation speed.

The estimation system 170 is shown as including a processor(s) 110 from the vehicle 100 of FIG. 1. Accordingly, the processor(s) 110 may be a part of the estimation system 170, the estimation system 170 may include a separate processor from the processor(s) 110 of the vehicle 100, or the estimation system 170 may access the processor(s) 110 through a data bus or another communication path. In one embodiment, the estimation system 170 includes a memory 210 that stores a detection module 220. The memory 210 is a random-access memory (RAM), a read-only memory (ROM), a hard-disk drive, a flash memory, or other suitable memory for storing the detection module 220. The detection module 220 is, for example, computer-readable instructions that when executed by the processor(s) 110 cause the processor(s) 110 to perform the various functions disclosed herein.

With reference to FIG. 2, the detection module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires the sensor data 250 that includes at least camera images. In further arrangements, the detection module 220 acquires the sensor data 250 from further sensors such as radar sensors 123, LIDAR sensors 124, and other sensors as may be suitable for identifying vehicles and locations of the vehicles.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

Moreover, in one embodiment, the estimation system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the detection module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the road slices 240. This includes lateral slices representing subsections of road edges that may have fixed dimensions for a road width (e.g., 30 meters (m)). Here, a road graph defines a topology and positional context of an area using road edges representing segments joining at nodes (e.g., intersection, interruption, etc.). However, a road graph may lack certain details regarding lanes (e.g., boundaries, lines, color, etc.). As explained below, the estimation system 170 can scale mapping a road longitudinally by merging lateral slices according to extracted features within a histogram.

Figure 3:
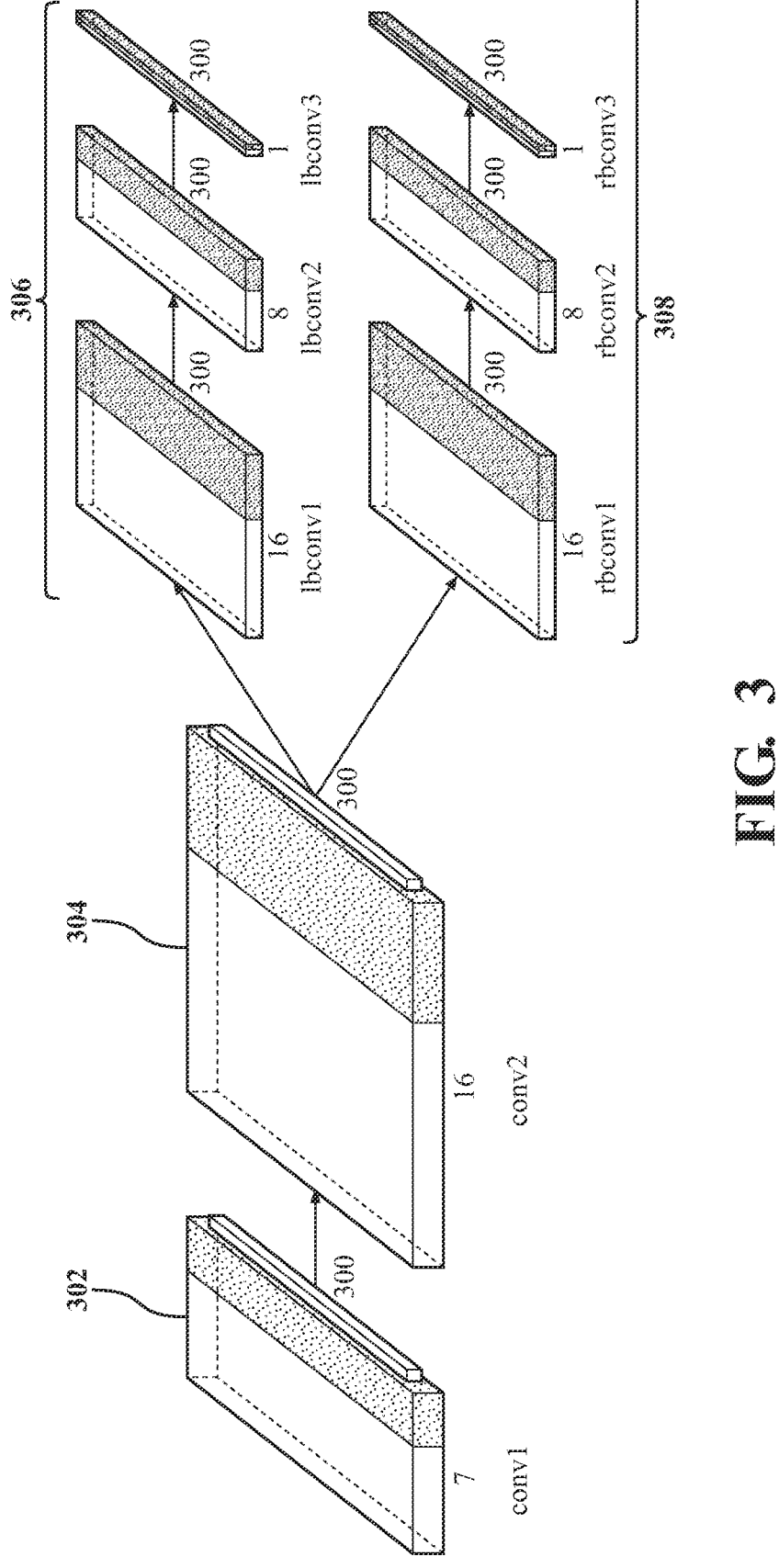
FIG. 3 illustrates one embodiment of the estimation system slicing data for a road edge using a neural model and estimating lane boundaries.

Now turning to FIG. 3, one embodiment of the estimation system 170 slicing data about a road edge for a neural model 300 to estimate lane boundaries is illustrated. Here, the estimation system 170 and the detection module 220 may include instructions that cause the processor 110 to discretize the sensor data 250 into 3D representations of road edges from a road graph, lane lines, etc. that resemble sparse LiDAR representations. A road edge can be a defined length on a road graph that topologically describes a mapped area. The lateral slice may be a fixed distance longitudinally along the road graph. In this way, the estimation system 170 reduces computational costs without sacrificing accuracy or detail when detecting lane boundaries through slicing.

Regarding the neural model 300, the lateral slice 302 has dimensions that define an amount of discrete information (e.g., 300 units wide) for processing by the neural model 300. Besides the neural model 300, the estimation system 170 can also implement other data-driven models that are trained to extract and infer lane boundaries using sliced data. The dimensions for the neural model 300 can factor a detection range for localities within the sliced data (e.g., lane boundaries with 2 m of detected feature). For example, keypoints of a road detected by a heuristic, data-driven, etc. model is information constituting the lateral slice 302 for a 30 meter (m) road width. In neural model 300, the detected keypoints have spatial position and type but may lack orientation about objects for accurately inferring lane boundaries.

In various implementations, the lateral slice 302 is an input having seven channels that are processed by the encoder 304 using a one-dimensional (1d) convolutional operation to 16 channels. A channel can be an input layer for detecting one of ego vehicle location, ego left boundary, ego right boundary, ego next lane left boundary, ego next lane right boundary, road boundary left, road boundary right, boundary type (e.g., dashed, solid, color, etc.), and so on. A layer can also apply learned weights to raw values in a learning model where the weight quantity is channels inputted multiplied by channels outputted and kernel size. In this way, the estimation system 170 locates detections points present across relevant channels to infer relationships and link lane boundaries with increased accuracy and detail.

As previously explained, slicing data has benefits because segments can solve a locally optimizable problem repeatedly. Slicing also improves solving disconnections or merging among inputs that impact decoding and improving global inferences as detection accuracy among lateral slices increases. For FIG. 3, the neural model 300 may select channels from lateral slices having keypoints that will expand detection areas and improve accuracy by applying various factoring. For example, the neural model 300 factors for detections channel offsets (e.g., distance from a vehicle), past lateral slices for gap filling, adjacent lateral slices for gap filling, and so on associated with slicing. Other factors for detections include data associated with a left line, a right line, an ego lane, an adjacent lane, a road boundary, a boundary type, a lane offset, a time-of-day, a heading, and so on. As such, the encoder 304 aggregates and separates data associated with channels into bins for extracting features. In one approach, the estimation system 170 forms a trace having a sequence of frames such that a frame has groups related detections (e.g., keypoints). In this way, the encoder 304 can use traces within a lateral slice per channel for identifying lane directionality using discrete frames, thereby improving system precision.

In one approach, the convolutional operation involves matrix multiplication and addition using detected keypoints per channel for fitting non-linearities and data compression while containing system costs. Here, the matrix calculations factor kernel size per layer and different channels for filling gaps of a lateral slice. Furthermore, the neural model 300 can implement various quantities of channels and kernel sizes per layer for different applications (e.g., lane tracking, night-time driving, etc.). For example, FIG. 3 illustrates the encoder 304 having a kernel size 9 with a padding four and a maxpool operation prior to another 1d convolutional operation from 16-to-16 channels using a kernel size nine and padding two. The kernel size can define areas with data to detect a salient feature. The maxpool quantifies the average presence of the salient feature. After further max-pooling, the encoder 304 extracts features about a lane boundary (LB) and a road boundary (RB) of a lane for decoding. In one approach, RB is also a lane boundary or RB equals LB when exhibiting similar features. In addition, the encoder 304 can featurize by separately counting data points (i.e., detection points for a particular channel) for bins of a lateral slice that are also present across the separate channels and form histograms accordingly. In this way, the encoder 304 factors context within a lateral slice according to a concentration of data points across channels for reducing computation costs and complexity.

Moreover, in one embodiment, the decoder 306 or 308 perform a 1d convolutional process from 16-to-8 channels using a kernel size three and padding one for particular applications. Here, although the neural model 300 illustrates implementing two decoders, the neural model 300 could implement a 2-depth layer for outputting the RB and LB values. In the neural model 300, a layer processes outputs from 8-to-1 channel using a 1d convolutional process having a kernel size three and padding one. Another process for 1-to-1 uses a 1d convolutional process for outputting confidence values and boundary placements for a RB and LB per lateral slice. Such boundary positions use an inverse distance between the RB/LB and inferred features that the neural model 300 assembles into a map. In particular, the neural model 300 may use inverse distances for simpler loss computations during training (e.g., a means square error loss), thereby reducing development costs.

Regarding generating a map, the estimation system 170 can link lane boundaries individually along road edges heuristically using the confidence values and the boundary positions outputted per lateral slice. This can include identifying relationships between lane characteristics that satisfy a threshold for an inverse distance and feature clarity along a road edge. For example, two end lateral slices have a dashed line with elevated confidence values with a middle lateral slice that is adjacent and includes missing paint. As such, the estimation system 170 can reliably merge the lateral slices together using a dashed line across three lateral slices if within the threshold for confidence and position.

Figure 4:
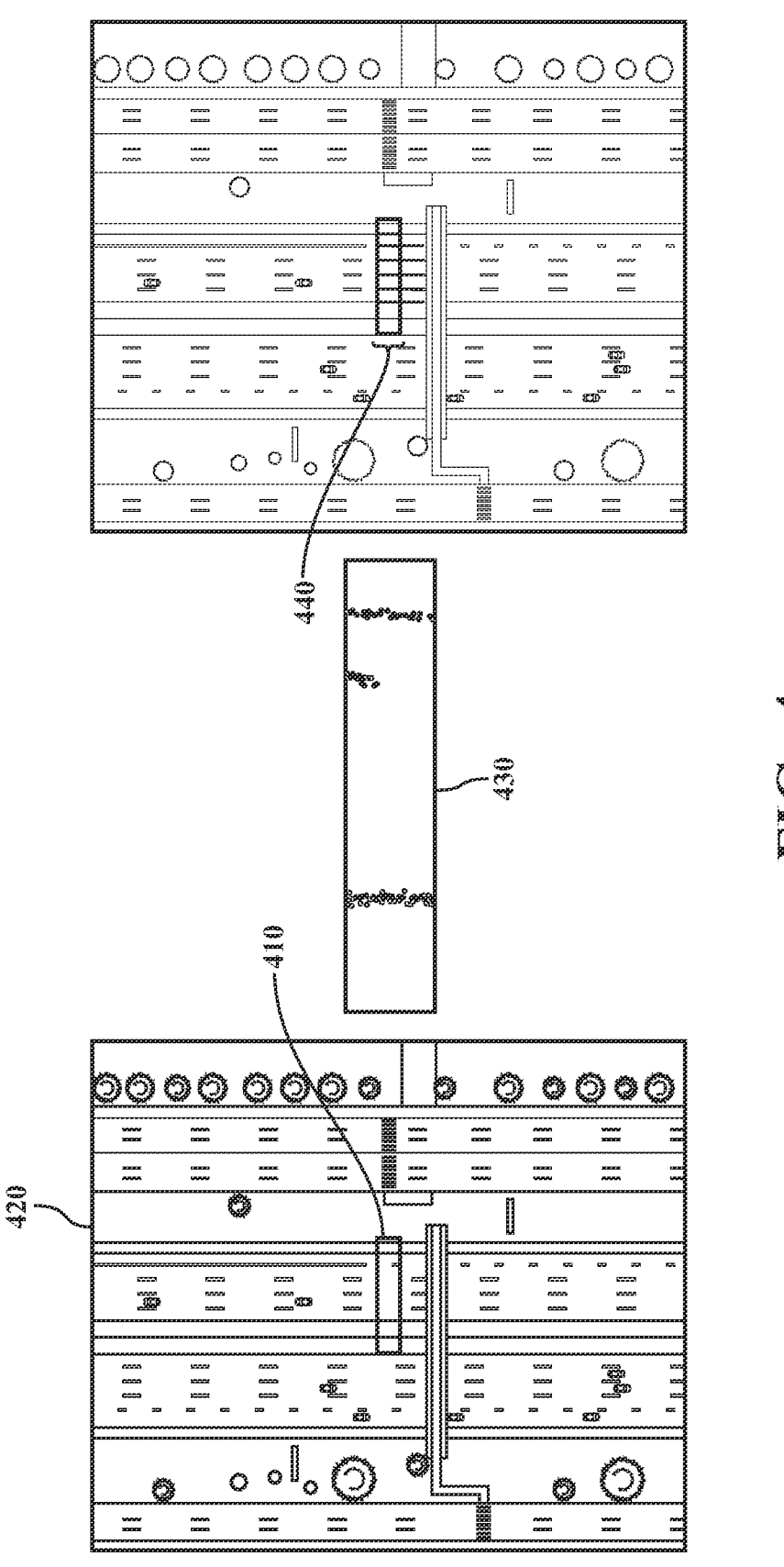
FIG. 4 illustrates an example of a sliced image for a road and the estimation system outputting inferred lane boundaries.

Now turning to FIG. 4, an example of a sliced image for a road and the estimation system 170 outputting inferred lane boundaries is illustrated. The estimation system 170 forms lateral slice 410 for a road edge in a road graph that topologically describes the expressway 420. Vision data 430 includes detected keypoints that the estimation system 170 uses to compute a histogram for the lateral slice 410. In one approach, the estimation system 170 correlates the keypoints with GPS data for improving positional accuracy. The neural model 300 can output 440 that are positioned points with respective confidence values for potential lane lines or boundaries. The estimation system 170 can generate a map at peaks of confidence values with the lateral line and lane boundary. In this way, the estimation system 170 improves the definition of lane boundaries and reduces computation costs using the lateral slice 410 that allows simpler geometric modeling and map generation.

Figure 5:
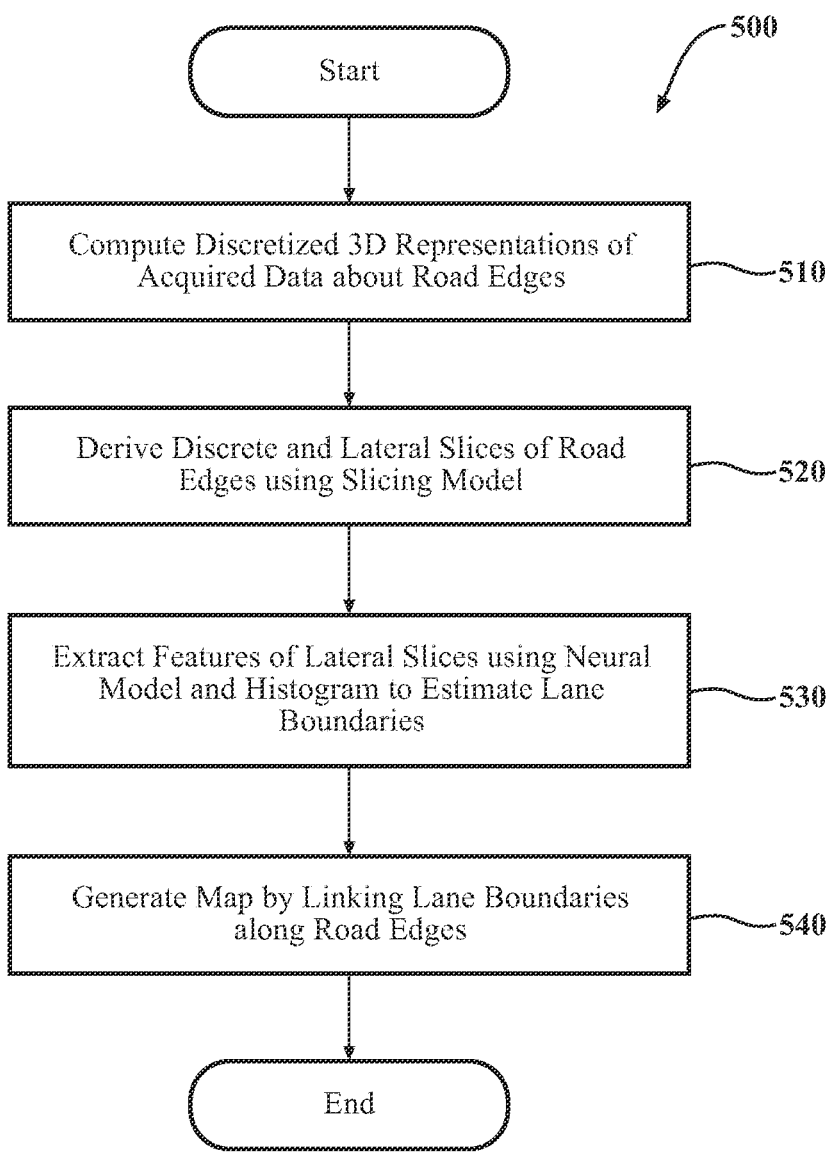
FIG. 5 illustrates one embodiment of a method that is associated with estimating lane boundaries using a slicing model and a neural model that extracts features per slice for generating maps.

Now turning to FIG. 5, a flowchart of the method 500 that is associated with estimating lane boundaries using a slicing model with road data for generating maps is illustrated. Method 500 will be discussed from the perspective of the estimation system 170 of FIGS. 1 and 2. While method 500 is discussed in combination with the estimation system 170, it should be appreciated that the method 500 is not limited to being implemented within the estimation system 170 but is instead one example of a system that may implement the method 500. Furthermore, the estimation system 170 may operate online in the vehicle 100 or offline on a server. As previously explained, online estimations benefit the vehicle 100 operating in an automated mode that demands high-definition and accurate map data. On the contrary, offline estimations benefit from increased computing power than the vehicle 100, thereby improving accuracy and computation speed.

At 510, the detection module 220 computes discretized 3D representations of acquired data about road edges. A road graph defines a topology including the positional context of an area where the road edges represent segments joining at nodes (e.g., intersection, interruption, etc.). The road map may lack details regarding lanes (e.g., boundaries, lines, color, etc.). Here, the acquired data can include detected data associated with a left line, a right line, an ego lane, an adjacent lane, a road boundary, a boundary type, a lane offset, a time-of-day, a heading, and so on. Other detected data includes channel offsets (e.g., distance from a vehicle), past lateral slices for gap filling, adjacent lateral slices for gap filling, and so on associated with slicing. As explained above, such data can be aggregated and separated into bins according to the source channel, slice parameters, and application.

At 520, the estimation system 170 derives discrete and lateral slices of road edges using a slicing model. Here, the slicing model heuristically forms the lateral slices from the acquired data and information about the road edges. The lateral slices can represent subsections of the road edges that may have fixed dimensions for a road width (e.g., 30 meters (m)). As previously explained, the estimation system 170 scales for mapping a road longitudinally by merging lateral slices according to extracted features within a histogram. For example, the estimation system 170 forms trace points within a lateral slice per channel for identifying lane directionality. In one approach, the estimation system 170 forms a trace having a sequence of frames such that a frame groups related detections (e.g., keypoints). In one approach, the encoder 304 uses trace points within a lateral slice per channel for identifying lane directionality using discrete frames, thereby improving system precision. Through the lateral slices, the estimation system 170 solves disconnections or merging among inputs that impacts decoding and improves global inferences as detection accuracy among lateral slices increases, thereby increasing system reliability.

At 530, the estimation system 170 extracts features of the lateral slices using a neural model and histogram to estimate lane boundaries. In one approach, the estimation system 170 extracts features about a LB and a RB for decoding by separately counting data points for bins of a lateral slice present across the separate channels. The counted data points can be organized into a histogram for further predictions. Accordingly, the estimation system 170 can factor context about a lateral slice according to data point concentration for increasing computational efficiency.

Regarding decoding, the estimation system 170 can individually or separately decode features extracted by encoding about lane boundaries. For example, a layer within a neural model processes encoder outputs using a 8-to-1 channel operation through a 1d convolutional process. Another process for 1-to-1 uses a 1d convolutional process for outputting confidence values and boundary placements for a RB and LB per lateral slice. Such boundary positions factor an inverse distance between the RB/LB and inferred features that the neural model 300 assembles into a map. As previously explained, the neural model 300 uses inverse distances for simpler loss calculations during training (e.g., a means square error loss), thereby reducing system costs.

At 540, the estimation system 170 generates a map by linking lane boundaries along the road edges. In one approach, the estimation system 170 links lane boundaries individually along road edges using heuristics. For example, the confidence values and the boundary positions per lateral slice derived from decoding are associated with potential lane boundaries. The estimation system 170 can identify relationships between lane characteristics that satisfy a threshold for an inverse distance and feature clarity along a road edge. For example, two end lateral slices have a dashed line with elevated confidence values with a middle lateral slice that is adjacent and includes missing paint. As such, the estimation system 170 can reliably merge the lateral slices together using a dashed line across three lateral slices if within the threshold for confidence and position. Accordingly, the estimation system 170 generates a map with updated and fuller lane boundaries by processing sliced data individually and linking slices, thereby improving the accuracy and efficiency of generating reliable maps (e.g., HD maps).

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the estimation system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140 and, thus, may be partially or fully autonomous as defined by the society of automotive engineers (SAE) levels 0 to 5.

The processor(s) 110, the estimation system 170, and/or the automated driving module(s) 160 can be operatively connected to communicate with the various vehicle systems 140 and/or individual components thereof. For example, returning to FIG. 1, the processor(s) 110, the estimation system 170, and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140.

The processor(s) 110, the estimation system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the estimation system 170, and/or the automated driving module(s) 160 can control the direction and/or speed of the vehicle 100. The processor(s) 110, the estimation system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the estimation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An estimation system comprising:
a processor; and
a memory storing instructions that, when executed by the processor, cause the processor to:
compute three-dimensional (3D) representations that are discretized from acquired data about road edges associated with driving lanes for a road;
derive discrete and lateral slices of the road edges using a slicing model, wherein the road edges are connected in a road graph that describes a mapped area, and the lateral slices comprising different channels with keypoints that expand information for an area on the road;
extract features from the lateral slices and the different channels individually using a neural model for forming a histogram to estimate lane boundaries about the driving lanes; and
generate a map by linking the lane boundaries individually along the road edges.

2. The estimation system of claim 1 further including instructions to output by a decoder confidence values and boundary placements for the lane boundaries through counting compressed data within bins of the histogram and the bins are each associated with one of the lateral slices, wherein the neural model includes the decoder.

3. The estimation system of claim 2, wherein the instructions to generate the map further include instructions to translate the map using an inverse distance to the lane boundaries from the confidence values and the boundary placements.

4. The estimation system of claim 2, wherein the instructions to extract the features further include instructions to:
process the keypoints of the driving lanes using matrix calculations for the different channels from the acquired data, wherein the matrix calculations include factoring kernel size per layer of the neural model that comprises layers, and the different channels fill gaps of the lateral slices;

adapt the neural model to implement pre-determined quantities of the different channels and the kernel size per layer according to an application; and fitting non-linearities from the matrix calculations to estimate the lane boundaries.

5. The estimation system of claim 4, wherein the layers of the neural model include trace points of a vehicle within one or more of the lateral slices and the trace points identify lane directionality.

6. The estimation system of claim 4 further including instructions to select the features using the neural model according to a distance between compressed data in bins of the histogram.

7. The estimation system of claim 1, wherein the instructions to generate the map further include instructions to link the lane boundaries individually according to two or more of the lateral slices being adjacent for at least one of the road edges, wherein the two or more of the lateral slices satisfy a feature clarity for the road edges.

8. The estimation system of claim 1 further including instructions to aggregate the features within the histogram, wherein the features include one of adjacent slices, confidence values, distance between vehicles, a boundary type, a lane offset, a surface type, a time-of-day, and a heading that are associated with the different channels from the acquired data.

9. The estimation system of claim 1, wherein the lateral slices are subsections of the road edges having fixed dimensions associated with the road graph that are scalable longitudinally using a merge of the features and data within the histogram varies according to the fixed dimensions and the scalability.

10. A non-transitory computer-readable medium comprising:

instructions that when executed by a processor cause the processor to:

compute three-dimensional (3D) representations that are discretized from acquired data about road edges associated with driving lanes for a road;

derive discrete and lateral slices of the road edges using a slicing model, wherein the road edges are connected in a road graph that describes a mapped area, and the lateral slices comprising different channels with keypoints that expand information for an area on the road;

extract features from the lateral slices and the different channels individually using a neural model for forming a histogram to estimate lane boundaries about the driving lanes; and generate a map by linking the lane boundaries individually along the road edges.

11. The non-transitory computer-readable medium of claim 10 further including instructions to output by a decoder confidence values and boundary placements for the lane boundaries through counting compressed data within bins of the histogram and the bins are each associated with one of the lateral slices, wherein the neural model includes the decoder.

12. A method comprising:

computing three-dimensional (3D) representations that are discretized from acquired data about road edges associated with driving lanes for a road;

deriving discrete and lateral slices of the road edges using a slicing model, wherein the road edges are connected in a road graph that describes a mapped area, and the lateral slices comprising different channels with keypoints that expand information for an area on the road;

extracting features from the lateral slices and the different channels individually using a neural model for forming a histogram to estimate lane boundaries about the driving lanes; and generating a map by linking the lane boundaries individually along the road edges.

13. The method of claim 12 further comprising:

outputting by a decoder confidence values and boundary placements for the lane boundaries through counting compressed data within bins of the histogram and the bins are each associated with one of the lateral slices, wherein the neural model includes the decoder.

14. The method of claim 13, wherein generating the map further includes:

translating the map using an inverse distance to the lane boundaries from the confidence values and the boundary placements.

15. The method of claim 13, wherein extracting the features further includes:

processing the keypoints of the driving lanes using matrix calculations for the different channels from the acquired data, wherein the matrix calculations include kernel size per layer of the neural model that comprises layers, and the different channels fill gaps of the lateral slices;

adapting the neural model to implement pre-determined quantities of the different channels and the kernel size per layer according to an application; and fitting non-linearities from the matrix calculations to estimate the lane boundaries.

16. The method of claim 15, wherein the layers of the neural model include trace points of a vehicle within one or more of the lateral slices and the trace points identify lane directionality.

17. The method of claim 15 further comprising selecting the features using the neural model according to a distance between compressed data in bins of the histogram.

18. The method of claim 12, wherein generating the map further includes linking the lane boundaries individually according to two or more of the lateral slices being adjacent for at least one of the road edges, wherein the two or more of the lateral slices satisfy a feature clarity for the road edges.

19. The method of claim 12 further comprising:

aggregating the features within the histogram, wherein the features include one of adjacent slices, confidence values, distance between vehicles, a boundary type, a lane offset, a surface type, a time-of-day, and a heading that are associated with the different channels from the acquired data.

20. The method of claim 12, wherein the lateral slices are subsections of the road edges having fixed dimensions associated with the road graph that are scalable longitudinally using merging of the features and data within the histogram varies according to the fixed dimensions and the scalability.

\* \* \* \* \*